United States Patent
Van Lier

(10) Patent No.: US 8,345,030 B2
(45) Date of Patent: Jan. 1, 2013

(54) SYSTEM AND METHOD FOR PROVIDING POSITIVE AND NEGATIVE VOLTAGES FROM A SINGLE INDUCTOR

(75) Inventor: Wilhelmus Johannes Robertus Van Lier, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 111 days.

(21) Appl. No.: 13/051,687

(22) Filed: Mar. 18, 2011

(65) Prior Publication Data

US 2012/0235976 A1   Sep. 20, 2012

(51) Int. Cl.
*G06F 3/038*   (2006.01)
*G06G 5/00*    (2006.01)

(52) U.S. Cl. ........................ 345/205; 345/206

(58) Field of Classification Search .................. 345/174, 345/204, 205, 206; 178/18.07
See application file for complete search history.

(56) References Cited

U.S. PATENT DOCUMENTS

| | | | |
|---|---|---|---|
| 4,954,789 A | 9/1990 | Sampsell | |
| 5,784,189 A | 7/1998 | Bozler et al. | |
| 6,040,937 A | 3/2000 | Miles | |
| 6,574,033 B1 | 6/2003 | Chui et al. | |
| 6,674,562 B1 | 1/2004 | Miles et al. | |
| 7,042,643 B2 | 5/2006 | Miles | |
| 7,123,216 B1 | 10/2006 | Miles | |
| 7,298,116 B2 | 11/2007 | Sluijs | |
| 7,327,510 B2 | 2/2008 | Cummings et al. | |
| 7,368,833 B2 | 5/2008 | Kranz | |
| 7,432,614 B2 | 10/2008 | Ma et al. | |
| 7,466,114 B2 | 12/2008 | Derckx et al. | |
| 7,560,299 B2 | 7/2009 | Cummings | |
| 7,579,713 B2 | 8/2009 | Uguen et al. | |
| 7,889,163 B2 | 2/2011 | Chui et al. | |
| 7,990,604 B2 | 8/2011 | Lee et al. | |
| 2004/0026757 A1 | 2/2004 | Crane, Jr. et al. | |
| 2005/0122560 A1 | 6/2005 | Sampsell et al. | |

(Continued)

FOREIGN PATENT DOCUMENTS

WO   WO 03/007049 A1   1/2003

(Continued)

OTHER PUBLICATIONS

Bayer et al., Mar. 19, 2006, A single-inductor multiple-output converter with peak current state-machine control, Applied Power Electronics Conference and Exposition, 21st Annual IEEE, pp. 153-159.

(Continued)

*Primary Examiner* — Amare Mengistu
*Assistant Examiner* — Insa Sadio
(74) *Attorney, Agent, or Firm* — Knobbe, Martens, Olson & Bear, LLP

(57) ABSTRACT

This disclosure provides systems, methods and apparatus, including computer programs encoded on computer storage media, for providing positive and negative voltages of a power supply. In one aspect, the power supply includes an inductor having a first end coupled via a source switch to a voltage source and coupled via a first plurality of output switches to a respective plurality of negative outputs and a second end coupled via a ground switch to a ground potential and coupled via a second plurality of output switches to a respective plurality of positive outputs and a controller adapted to configure the switches into at least one of multiple configurations.

28 Claims, 16 Drawing Sheets

U.S. PATENT DOCUMENTS

2007/0247875 A1* 10/2007 Ackermann et al. ............ 363/16
2008/0297127 A1   12/2008 Premont et al.
2010/0245313 A1    9/2010 Lewis et al.

FOREIGN PATENT DOCUMENTS

WO   WO 03/073151     9/2003
WO   WO 2004/026757   4/2004

OTHER PUBLICATIONS

Ki et al., Jun. 17, 2001, Single-inductor multiple-output switching converters, 32nd Annual IEEE Power Electronics Specialists Conference Proceedings, 1(17):226-231.

ISR and WO dated Apr. 18, 2012 in PCT/US12/027894.

* cited by examiner

Common Voltages

| | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

SYSTEM AND METHOD FOR PROVIDING POSITIVE AND NEGATIVE VOLTAGES FROM A SINGLE INDUCTOR

TECHNICAL FIELD

This disclosure relates to methods and systems for driving electromechanical systems such as interferometric modulators.

DESCRIPTION OF THE RELATED TECHNOLOGY

Electromechanical systems includes devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in a display device including a plurality of display elements, a driver circuit configured to drive the display elements at a plurality of voltages, and a power supply configured to provide the plurality of voltages. In some implementations, the power supply may include an inductor having a first end coupled via a source switch to a voltage source and coupled via a first plurality of output switches to a respective plurality of negative outputs. The inductor may further include a second end coupled via a ground switch to a ground potential and coupled via a second plurality of output switches to a respective plurality of positive outputs. The power supply may further include a controller adapted to configure the switches into at least a first configuration in which the source switch is closed, each of the first plurality of output switches is open, the ground switch is closed, and each of the second plurality of output switches is open, a second configuration in which the source switch is closed, each of the first plurality of output switches is open, the ground switch is open, and one of the second plurality of output switches is closed, and a third configuration in which the source switch is open, one of the first plurality of output switches is closed, the ground switch is closed, and each of the second plurality of output switches is open.

In some implementations, the controller is further adapted to configure the switches into a fourth configuration in which the source switch is open, one of the first plurality of output switches is closed, the ground switch is open, and one of the second plurality of output switches is closed.

In some implementations, the display device includes a first plurality of capacitors, each of the first plurality of capacitors having a first end coupled to one of the first plurality of outputs and a second end coupled to a ground potential, and a second plurality of capacitors, each of the second plurality of capacitors having a first end coupled to one of the second plurality of outputs and a second end coupled to the ground potential.

In some implementations, at least one of the output switches is a diode.

Another innovative aspect can be implemented in a method of providing negative and positive outputs of a power supply. In some implementations, the method includes connecting a first end of an inductor to a voltage source and a second end of the inductor to a ground voltage for a period of time sufficient to cause a current to flow through the inductor. Then, until the current flowing through the inductor drops substantially to zero, the method includes disconnecting the first end of the inductor from the voltage source and sequentially connecting the first end of the inductor to two or more negative outputs to cause the current flowing through the inductor to flow from at least two of the two or more negative outputs; or disconnecting the second end of the inductor from the ground potential and sequentially connecting the second end of the inductor to two or more positive outputs to cause the current flowing through the inductor to flow to at least two of the two or more positive outputs; or disconnecting the first end of the inductor from the voltage source, disconnecting the second end of the inductor from the ground potential, connecting the first end of the inductor to one of the two or more negative outputs, and connecting the second end of the inductor to one of the two or more positive outputs.

In some implementations, the method includes disconnecting the second end of the inductor from the ground potential and connecting the first end of the inductor to the voltage source. In some implementations, the method includes disconnecting the second end of the inductor from the ground potential and connecting the first end of the inductor to a negative output.

In some implementations, the method includes reconnecting the first end of the inductor to the voltage source and the second end of the inductor to the ground voltage for a period of time sufficient to cause the current to flow through the inductor.

Another innovative aspect can be implemented in an apparatus for providing negative and positive outputs of a power supply. In some implementations, the apparatus includes means for connecting a first end of an inductor to a voltage source and a second end of the inductor to a ground voltage for a period of time sufficient to cause a current to flow through the inductor. In some implementations, the apparatus includes means for performing at least one of the following until the current flowing through the inductor drops substantially to zero: disconnecting the first end of the inductor from the voltage source and sequentially connecting the first end of the inductor to two or more negative outputs to cause the current flowing through the inductor to flow from at least two of the two or more negative outputs, disconnecting the second end of the inductor from the ground potential and sequentially connecting the second end of the inductor to two or more positive outputs to cause the current flowing through the inductor to flow to at least two of the two or more positive outputs, and disconnecting the first end of the inductor from the voltage source, disconnecting the second end of the inductor from the ground potential, connecting the first end of the inductor to one of the two or more negative outputs, and connecting the second end of the inductor to one of the two or more positive outputs.

In some implementations, the apparatus includes means for disconnecting the second end of the inductor from the ground potential and connecting the first end of the inductor to the voltage source. In some implementations, the apparatus includes means for disconnecting the second end of the inductor from the ground potential and connecting the first end of the inductor to a negative output.

In some implementations, the apparatus includes means for reconnecting the first end of the inductor to the voltage source and the second end of the inductor to the ground voltage for a period of time sufficient to cause the current to flow through the inductor.

Another innovative aspect can be implemented in a method of providing negative or positive outputs of a power supply. In some implementations, the method includes connecting a first end of an inductor to a voltage source and a second end of the inductor to a ground voltage for a period of time sufficient to cause a current to flow through the inductor. In some implementations, the method includes disconnecting the first end of the inductor from the voltage source and sequentially connecting the first end of the inductor to two or more negative outputs to cause the current flowing through the inductor to flow from at least two of the two or more negative outputs, disconnecting the second end of the inductor from the ground potential and sequentially connecting the second end of the inductor to two or more positive outputs to cause the current flowing through the inductor to flow to at least two of the two or more positive outputs, and disconnecting the first end of the inductor from the voltage source, disconnecting the second end of the inductor from the ground potential, connecting the first end of the inductor to one of the two or more negative outputs, and connecting the second end of the inductor to one of the two or more positive outputs.

In some implementations, the method includes disconnecting the second end of the inductor from the ground potential and connecting the first end of the inductor to the voltage source. In some implementations, the method includes disconnecting the second end of the inductor from the ground potential and connecting the first end of the inductor to a negative output.

In some implementations, the method includes reconnecting the first end of the inductor to the voltage source and the second end of the inductor to the ground voltage for a period of time sufficient to cause the current to flow through the inductor.

Another innovative aspect can be implemented in an apparatus for providing negative or positive outputs of a power supply. In some implementations, the apparatus includes means for connecting a first end of an inductor to a voltage source and a second end of the inductor to a ground voltage for a period of time sufficient to cause a current to flow through the inductor. In some implementations, the apparatus includes means for disconnecting the first end of the inductor from the voltage source and sequentially connecting the first end of the inductor to two or more negative outputs to cause the current flowing through the inductor to flow from at least two of the two or more negative outputs, means for disconnecting the second end of the inductor from the ground potential and sequentially connecting the second end of the inductor to two or more positive outputs to cause the current flowing through the inductor to flow to at least two of the two or more positive outputs, and means for disconnecting the first end of the inductor from the voltage source, disconnecting the second end of the inductor from the ground potential, connecting the first end of the inductor to one of the two or more negative outputs, and connecting the second end of the inductor to one of the two or more positive outputs.

In some implementations, the apparatus includes means for disconnecting the second end of the inductor from the ground potential and connecting the first end of the inductor to the voltage source. In some implementations, the apparatus includes means for disconnecting the second end of the inductor from the ground potential and connecting the first end of the inductor to a negative output.

In some implementations, the apparatus includes means for reconnecting the first end of the inductor to the voltage source and the second end of the inductor to the ground voltage for a period of time sufficient to cause the current to flow through the inductor.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
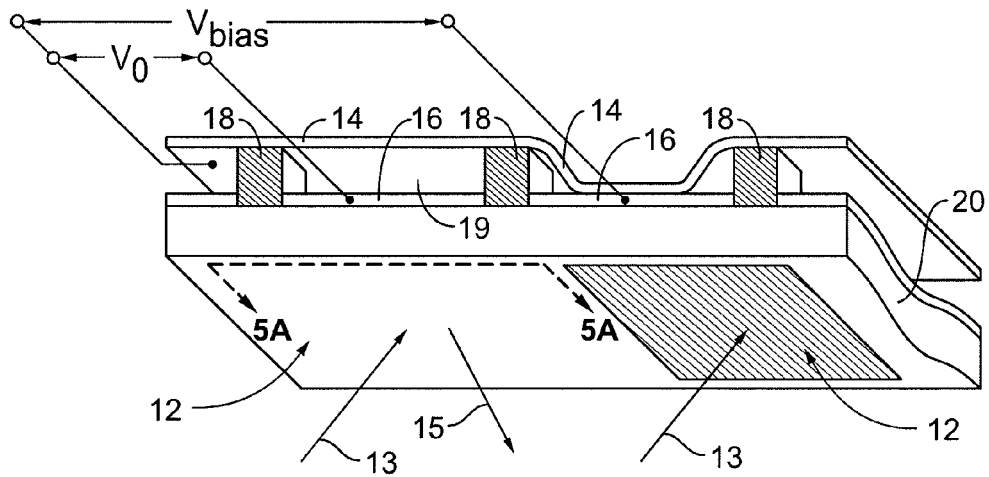
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

An inductor stores energy in a magnetic field created by electrical current flowing through it. In some implementations, a power supply is controlled to magnetize an inductor using a source voltage. The power supply is controlled to use the stored energy to selectively charge capacitors coupled to power supply outputs. The capacitors are selectively charged to maintain specific voltages at the various power supply outputs. By coupling capacitors to each end of the inductor, both positive and negative power supply outputs can be maintained.

As displays based on electromechanical devices become larger, addressing of the entire display becomes more difficult, and a desired frame rate may be more difficult to achieve. A low voltage drive scheme, in which a given row of electromechanical devices is released before new information is written to the row, and in which the data information is conveyed using a smaller range of voltages, addresses these issues by allowing shorter line times. However, such a drive scheme uses multiple different voltages, complicating the design of the power supply and potentially requiring more power to keep the power supply outputs available for display addressing. Simpler and more power efficient supply circuits are disclosed herein that derive some of the necessary outputs from other outputs at the required times.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
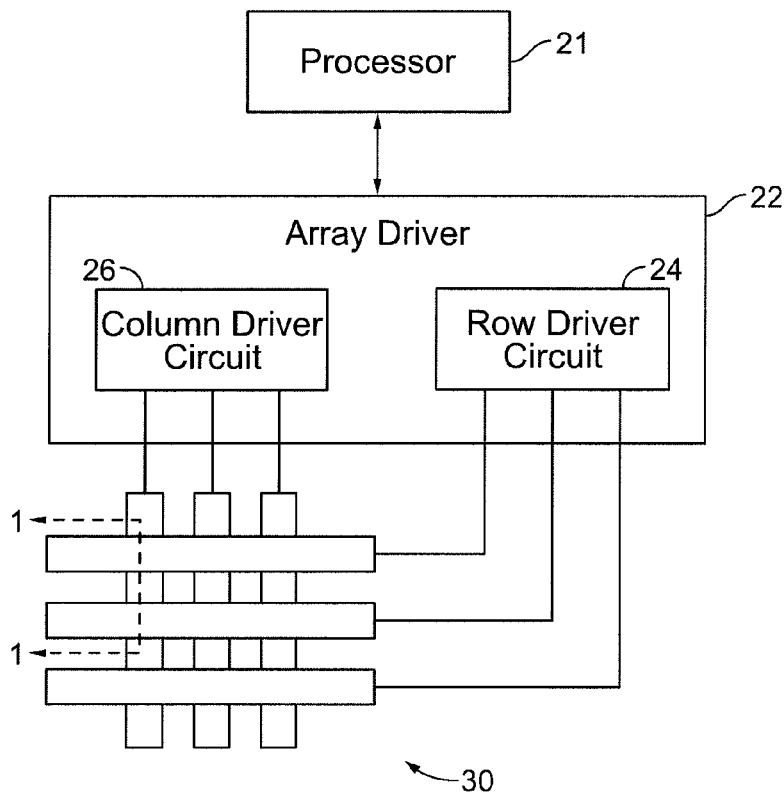
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3A, 3B:
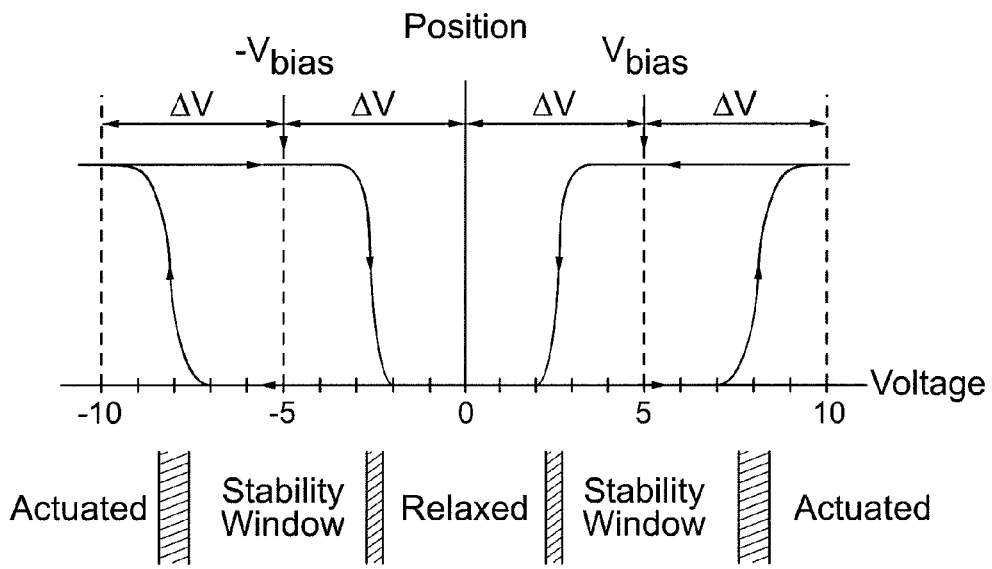
FIG. 3A shows an example of a diagram illustrating movable reflective layer position versus applied voltage for the interferometric modulator of FIG. 1.
FIG. 3B shows an example of a table illustrating various states of an interferometric modulator when various common and segment voltages are applied.

FIG. 3A shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3A. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3A, exists where there is a window of applied voltage within which the device is stable in either the relaxed or actuated state. This is referred to herein as the "hysteresis window" or "stability window." For a display array 30 having the hysteresis characteristics of FIG. 3A, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 3B shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 3B (as well as in the timing diagram shown in FIG. 4B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3A, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 4A:
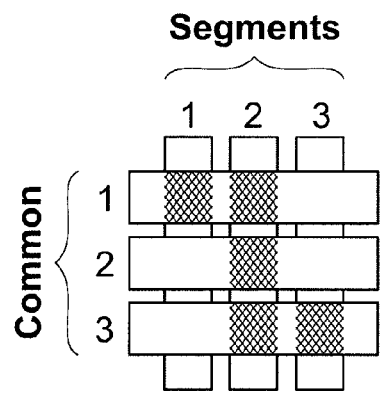
FIG. 4A shows an example of a diagram illustrating a frame of display data in the 3×3 interferometric modulator display of FIG. 2.
Figure 4B:
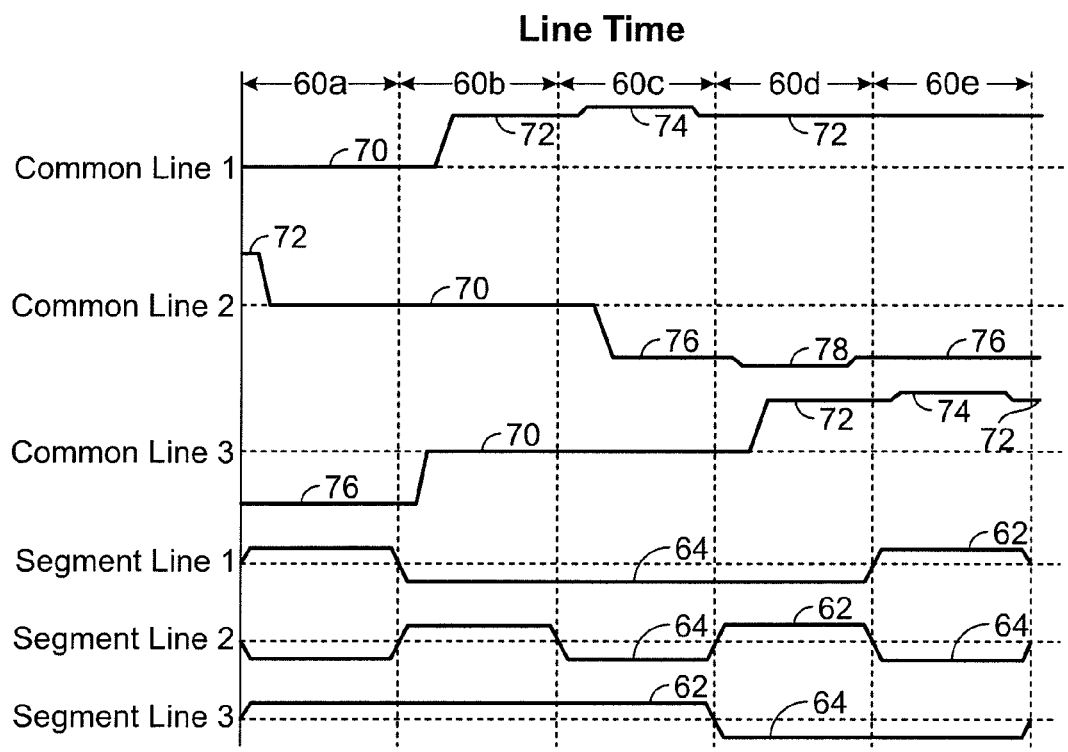
FIG. 4B shows an example of a timing diagram for common and segment signals that may be used to write the frame of display data illustrated in FIG. 4A.

FIG. 4A shows an example of a diagram illustrating a frame of display data in the 3×3 interferometric modulator display of FIG. 2. FIG. 4B shows an example of a timing diagram for common and segment signals that may be used to write the frame of display data illustrated in FIG. 4A. The signals can be applied to the, e.g., 3×3 array of FIG. 2, which will ultimately result in the line time 60e display arrangement illustrated in FIG. 4A. The actuated modulators in FIG. 4A are in a dark-state, i.e., where a substantial portion of the reflected light is outside of the visible spectrum so as to result in a dark appearance to, e.g., a viewer. Prior to writing the frame illustrated in FIG. 4A, the pixels can be in any state, but the write procedure illustrated in the timing diagram of FIG. 4B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 3B, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 4A, and will remain in that state as long as the hold voltages are applied along the common lines, regardless of variations in the segment voltage which may occur when modulators along other common lines (not shown) are being addressed.

In the timing diagram of FIG. 4B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 4B. In some other implementations, voltages applied along common lines or segment lines may vary to account for variations in the actuation and release voltages of different modulators, such as modulators of different colors.

Figure 5A:
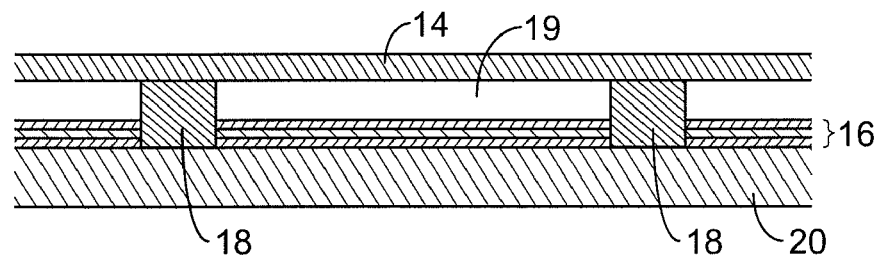
FIG. 5A shows an example of a partial cross-section of the interferometric modulator display of FIG. 1.
Figure 5B:
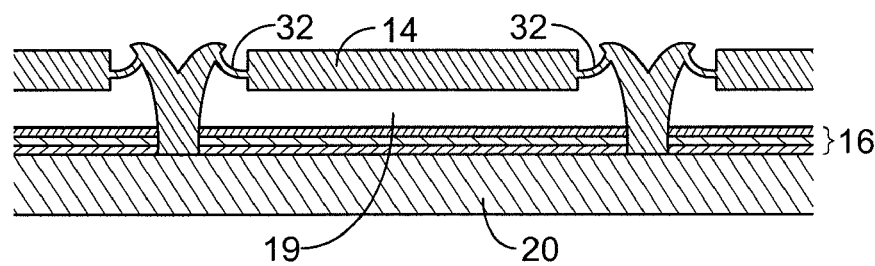
FIGS. 5B-5E show examples of cross-sections of varying implementations of interferometric modulators.
Figure 5C:
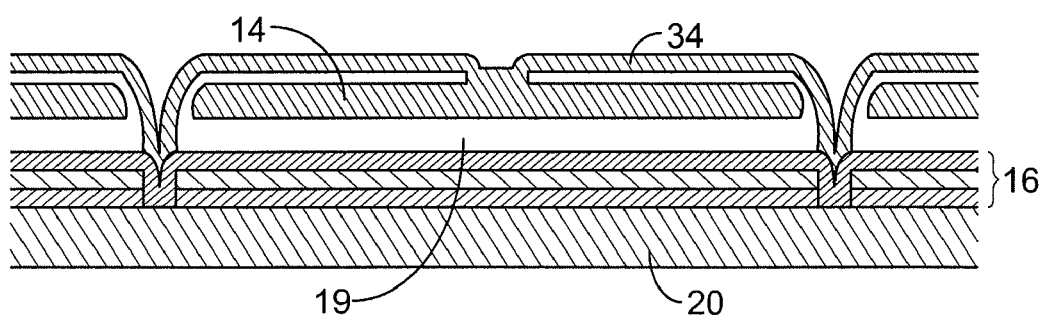

The details of the structure of interferometric modulators that operate in accordance with the principles set forth above may vary widely. For example, FIGS. 5A-5E show examples of cross-sections of varying implementations of interferometric modulators, including the movable reflective layer 14 and its supporting structures. FIG. 5A shows an example of a partial cross-section of the interferometric modulator display of FIG. 1, where a strip of metal material, i.e., the movable reflective layer 14 is deposited on supports 18 extending orthogonally from the substrate 20. In FIG. 5B, the movable reflective layer 14 of each IMOD is generally square or rectangular in shape and attached to supports at or near the corners, on tethers 32. In FIG. 5C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 5C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 5D:
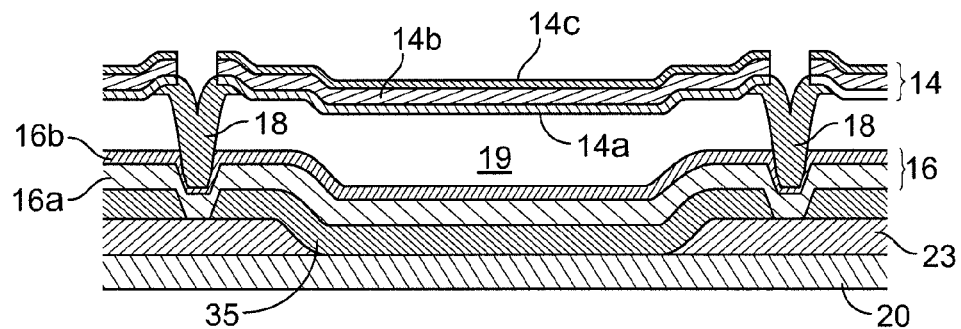

FIG. 5D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 5D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 5E:
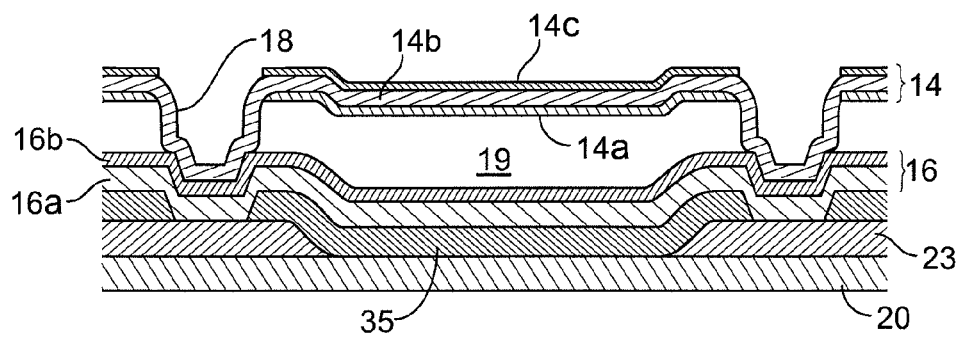

FIG. 5E shows another example of an IMOD, where the movable reflective layer 14 is self supporting. In contrast with FIG. 5D, the implementation of FIG. 5E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 5E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 5A-5E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 5C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 5A-5E can simplify processing, such as, e.g., patterning.

Figure 6:
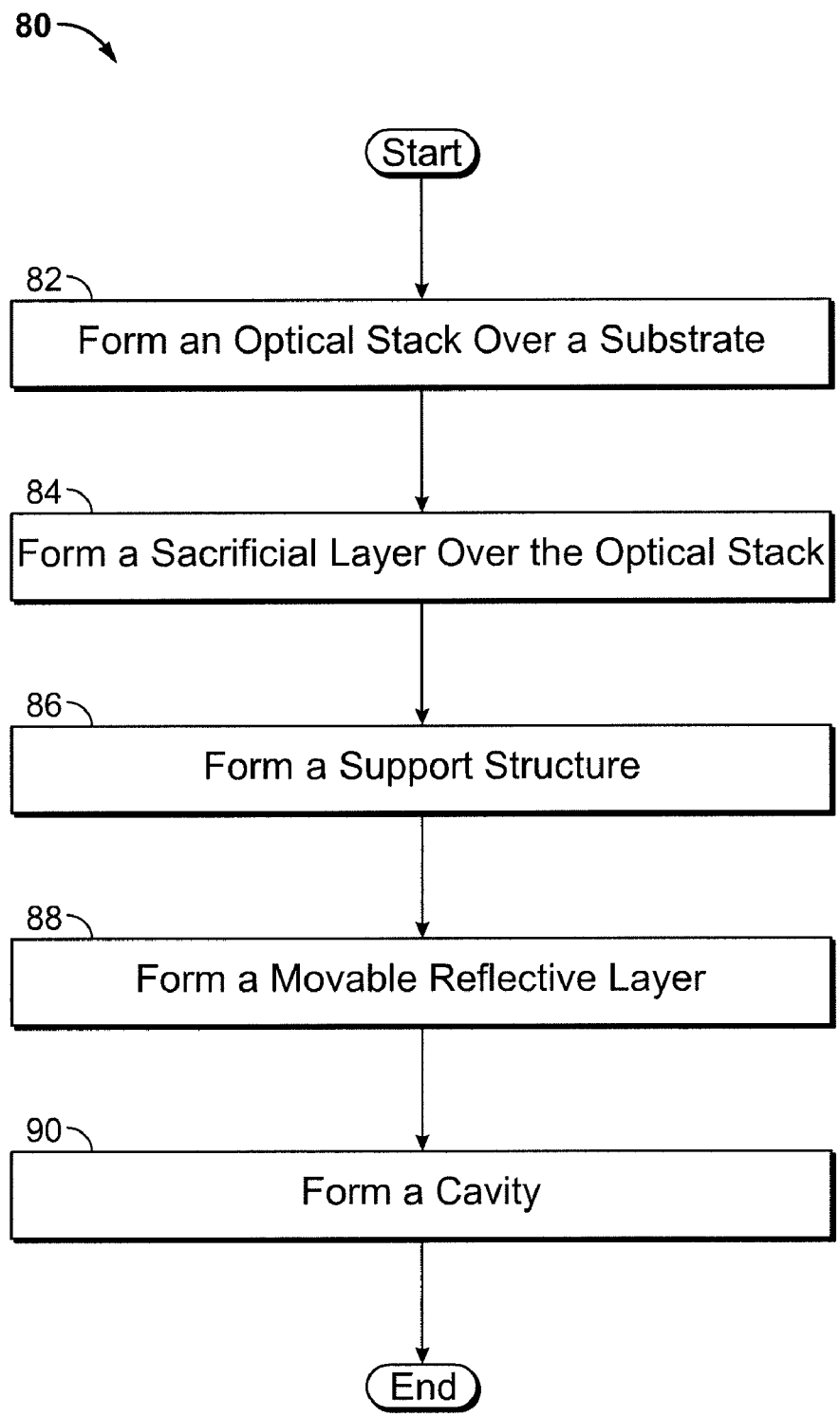
FIG. 6 shows an example of a flow diagram illustrating a manufacturing process for an interferometric modulator.
Figure 7A:
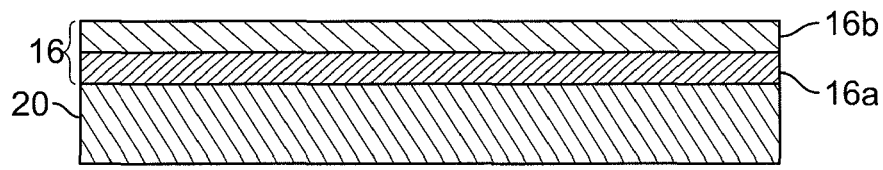
FIGS. 7A-7E show examples of cross-sectional schematic illustrations of various stages in a method of making an interferometric modulator.

FIG. 6 shows an example of a flow diagram illustrating a manufacturing process 80 for an interferometric modulator, and FIGS. 7A-7E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 5, in addition to other blocks not shown in FIG. 6. With reference to FIGS. 1, 5 and 6, the process 80 begins at block 82 with the formation of the optical stack 16 over the substrate 20. FIG. 7A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 7A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 7B:
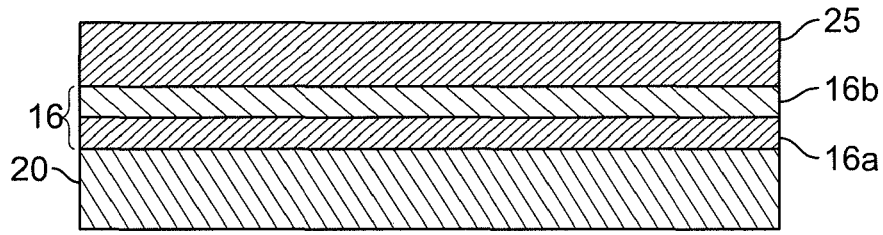

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 7B illustrates a partially fabricated device including a sacrificial layer 25 formed over the optical stack 16. The formation of the sacrificial layer 25 over the optical stack 16 may include deposition of a xenon difluoride (XeF$_2$)-etchable material such as molybdenum (Mo) or amorphous silicon (Si), in a thickness selected to provide, after subsequent removal, a gap or cavity 19 (see also FIGS. 1 and 7E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 7C:
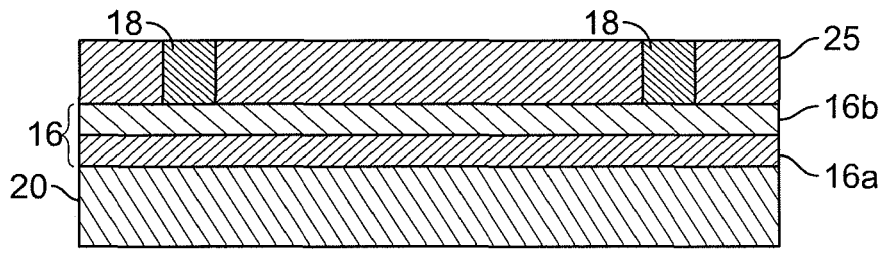

The process 80 continues at block 86 with the formation of a support structure e.g., a post 18 as illustrated in FIGS. 1, 5 and 7C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 5A. Alternatively, as depicted in FIG. 7C, the aperture formed in the sacrificial layer 25 can extend through the sacrificial layer 25, but not through the optical stack 16. For example, FIG. 7E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 7C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 7D:
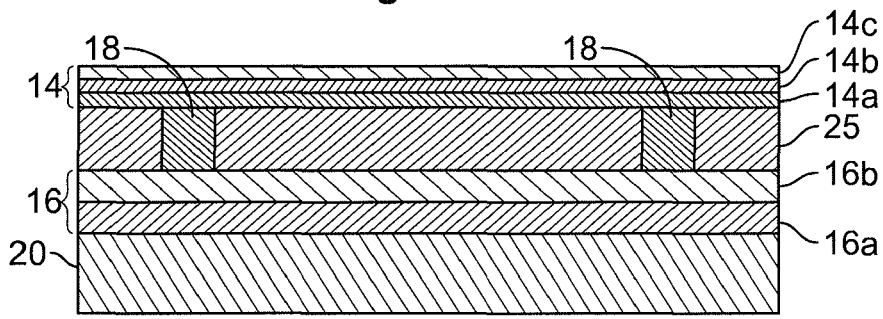
Figure 7E:
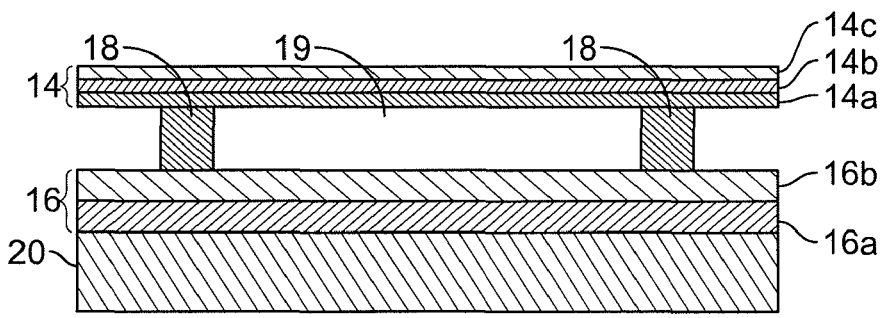

The process 80 continues at block 88 with the formation of a movable reflective layer or membrane such as the movable reflective layer 14 illustrated in FIGS. 1, 5 and 7D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 7D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 5 and 7E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid XeF$_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

In some implementations, alternate drive schemes may be utilized to minimize the power required to drive the display, as well as to allow a common line of electromechanical devices to be written to in a shorter amount of time. In some implementations, a release or relaxation time of an electromechanical device such as an interferometric modulator may be longer than an actuation time of the electromechanical device, as the electromechanical device may be pulled to an unactuated or released state only via the mechanical restoring force of the movable layer. In contrast, the electrostatic force actuating the electromechanical device may act more quickly on the electromechanical device to cause actuation of the electromechanical device. In the high voltage drive scheme discussed above, the write time for a given line must be sufficient to allow not only the actuation of previously unactuated electromechanical devices, but to allow for the unactuation of previously actuated electromechanical devices. The release rate of the electromechanical devices may thus act as a limiting factor in some implementations, which may inhibit the use of higher refresh rates for larger display arrays.

Figure 8:
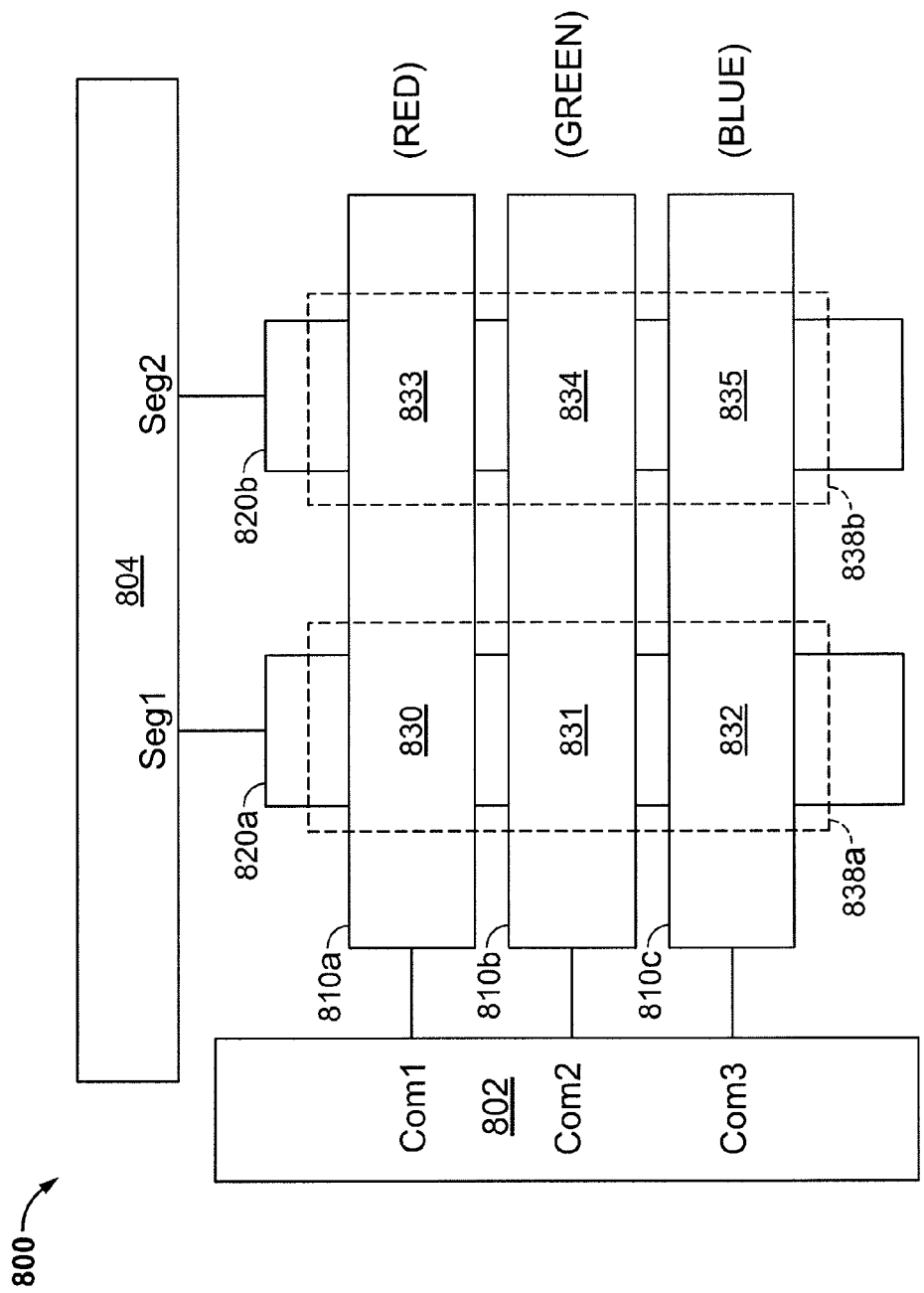
FIG. 8 shows an example of a schematic illustration of a 2×3 array of interferometric modulators illustrating color pixels.

An alternate drive scheme, referred to herein as a low voltage drive scheme, may provide improved performance over the drive scheme discussed above, in which the bias voltage is supplied by the common electrode rather than the segment electrode. This is illustrated by reference to FIGS. 8 and 9. FIG. 8 shows an example schematic illustration of a 2×3 array of interferometric modulators illustrating color pixels. The array 800 of interferometric modulators includes three common lines 810a, 810b and 810c, and two segment lines 820a, 820b. An independently addressable pixel 830, 831, 832, 833, 834 and 835 is located at each intersection of a common line and a segment line. Thus, the voltage across pixel 830 is the voltage difference between common line 810a and segment line 820a. This voltage differential across a pixel is alternately referred to herein as a pixel voltage. Similarly, pixel 831 is the intersection of common line 810b and segment line 820a, and pixel 832 is the intersection of column line 810c and segment line 820a. Pixels 833, 834 and 835 are the intersections of segment line 820*b* with common lines 810*a*, 810*b* and 810*c*, respectively. In the illustrated implementation, the common lines include a movable electrode, and the electrode in the segment lines are fixed portions of an optical stack, but it will be understood that in other implementations the segment lines may include movable electrodes, and the common lines may comprise fixed electrodes. Common voltages may be applied to common lines 810*a*, 810*b* and 810*c* by common driver circuitry 802, and segment voltages may be applied to segment lines 820*a* and 820*b* via segment driver circuitry 804.

As will be explained further below, the pixels along each common line may be formed to reflect a different color. To make a color display, for example, the display may contain rows (or columns) of red, green, and blue pixels. Thus, the Com1 output of driver 802 may drive a line of red pixels, the Com2 output of driver 802 may drive a line of green pixels, and the Com3 output of driver 802 may drive a line of blue pixels. A person having ordinary skill in the art will readily appreciate that in an actual display, there may be hundreds of red, green, and blue sets of pixel lines extending down, with FIG. 8 showing only the first set.

Figure 9:
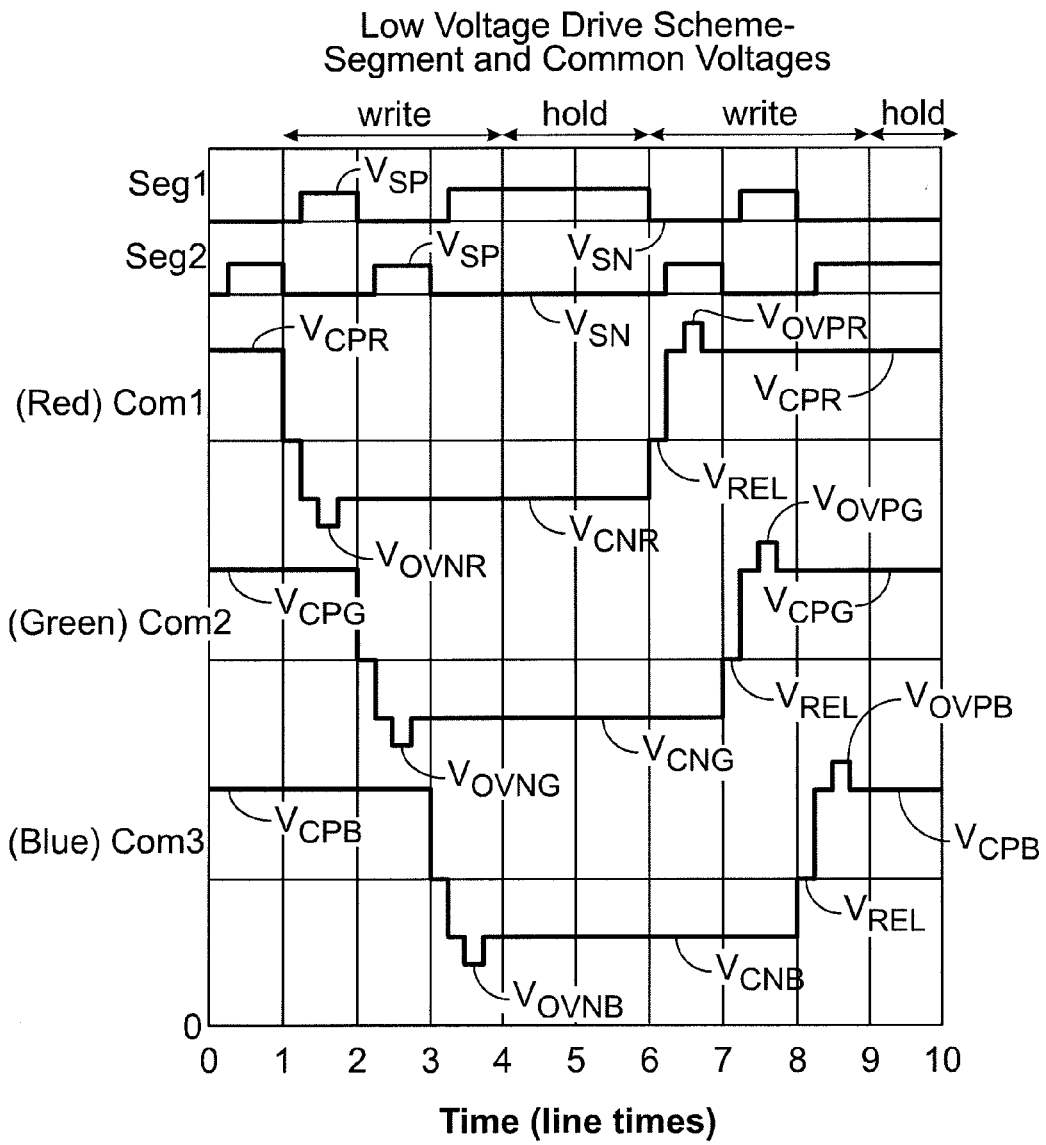
FIG. 9 illustrates an example of a timing diagram for segment and common signals that may be used to write frames of display data to the 2×3 display of FIG. 8 using another example drive scheme.

FIG. 9 illustrates an example of a timing diagram for segment and common signals that may be used to write frames of display data to the 2×3 display of FIG. 8 using another example drive scheme. Waveform Seg1 represents the segment voltage as a function of time applied along segment line 820*a* of FIG. 8, and waveform Seg2 represents the segment voltage applied along segment line 820*b*. Waveform Com1 represents the common voltage applied along column line 810*a* of FIG. 8, waveform Com2 represents the common voltage applied along column line 810*b* and waveform Com3 represents the common voltage applied along column line 810*c*.

In one implementation, the voltage applied on segment lines 820*a* and 820*b* is switched between a positive segment voltage $V_{SP}$ and a negative segment voltage $V_{SN}$. The voltage applied on common lines 810*a*, 810*b* and 810*c* can be switched between at least 5 different voltages, one of which is a ground state in some implementations. The four non-ground voltages are a positive hold voltage $V_{SP}$, a positive overdrive voltage $V_{OVP}$, a negative hold voltage $V_{CN}$ and a negative overdrive voltage $V_{OVN}$. The hold voltages can be selected such that the pixel voltage will lie within the hysteresis windows of the pixels (the positive hysteresis value for the positive hold voltage and the negative hysteresis value for the negative hold voltage) when appropriate segment voltages are used. The absolute values of the possible segment voltages can be sufficiently low such that a pixel with a hold voltage applied on its common line will thus remain in the current state regardless of the particular segment voltage currently applied on its segment line.

In some implementations, the segment voltages $V_{SP}$ and $V_{SN}$ may be a relatively low voltage (as compared to the common voltages). For example, the positive segment voltage $V_{SP}$ may be approximately 1 to 2 volts and $V_{NP}$ may be approximately −2 to 0 volts. The segment voltages $V_{SP}$ and $V_{SN}$ may not be symmetric about the ground voltage. Similarly, the positive and negative hold and overdrive voltage may not be symmetric about the ground voltage. In some implementations, the positive and negative hold and overdrive voltages are determined based on the respective segment voltages such that the pixel voltage will lie within the hysteresis windows of the pixels (the positive hysteresis value for the positive hold voltage and the negative hysteresis value for the negative hold voltage) when the segment voltages are used.

As mentioned above, the negative segment voltage $V_{NP}$ may be approximately 0 volts. A person having ordinary skill in the art will readily appreciate that the terms "positive" and "negative" as used with respect to the applied voltages does not necessarily refer to the polarity of the voltage with respect to a ground potential, but rather reflect that the positive voltages are, in some implementations, greater (more positive) than their respective negative voltages.

In FIG. 9, it can be seen that each of the common line voltages begins at a positive hold value ($V_{CPR}$, $V_{CPG}$ and $V_{CPB}$, respectively). These hold values are designated differently because they will generally be different voltage levels depending on whether a red (R) line of pixels, a green (G) line of pixels, or a blue (B) line of pixels is being driven. As noted above, the state of the pixels along the common lines can remain constant during application of the positive hold voltage along the common lines, regardless of the state of the segment voltages.

The common line voltage on common line 810*a* (Com1) then moves to a state $V_{REL}$, which may be ground, causing release of the pixels 830 and 833 along common line 810*a*. In this implementation, the segment voltages are both set to $V_{SN}$ at this point (as can be seen in waveforms Seg1 and Seg2), but given proper selection of voltage values, the pixels would release even if either of the segment voltages was at the positive segment voltage $V_{SP}$.

The common line voltage on line 810*a* (Com1) then moves to a negative hold value $V_{CNR}$. When the voltage is at the negative hold value $V_{CNR}$, the segment line voltage for segment line 820*a* (waveform Seg1) is at a positive segment voltage $V_{SP}$, whereas the segment line voltage for segment line 820*b* (waveform Seg2) is at a negative segment voltage $V_{SN}$. The voltage across each of pixels 830 and 833 moves past the release voltage $V_{REL}$ to within the positive hysteresis window without moving beyond the positive actuation voltage. Pixels 830 and 833 thus remain in their previously released state.

The common line voltage on line 810*a* (waveform Com 1) is then decreased to a negative overdrive voltage $V_{OVNR}$. The behavior of the pixels 830 and 833 is now dependent upon the segment voltages currently applied along their respective segment lines. For pixel 830, the segment line voltage for segment line 820*a* is at a positive segment voltage $V_{SP}$, and the pixel voltage of pixel 830 increases beyond the positive actuation voltage. Pixel 830 is thus actuated at this time. For pixel 833, the segment line voltage for segment line 820*b* is at a negative segment voltage $V_{SN}$, the pixel voltage does not increase beyond the positive actuation voltage, so pixel 833 remains unactuated.

Next, the common line voltage along line 810*a* (waveform Com 1) is increased back to the negative hold voltage $V_{CNR}$. As previously discussed, the voltage differential across the pixels remains within the hysteresis window when the negative hold voltage is applied, regardless of the segment voltage. The voltage across pixel 830 thus drops below the positive actuation voltage but remains above the positive release voltage, and thus remains actuated. The voltage across pixel 833 does not drop below the positive release voltage, and will remain unactuated.

As indicated in FIG. 9, the common line voltage on common lines 810*b* and 810*c* moves in a similar fashion, with a delay of one line time cycle between each of the common lines to write the frame of display data to the array. After a hold period, the process is repeated with the common and segment voltages of opposite polarities. Although, in the above description the common lines are addressed in a particular order, a person having ordinary skill in the art will readily appreciate that other orders can be used. For example, the common line voltages for common line 810b can be modulated, followed by common line 810a, then common line 810c.

As mentioned above, in a color display, the array segment 800 illustrated in FIG. 8 may include three colors of pixels, with each of the pixels 830-835 including a pixel of a particular color. The colored pixels may be arranged such that each common line 810a, 810b and 810c defines a common line of pixels of similar colors. For example, in an RGB display, pixels 830 and 833 along common line 810a may comprise red pixels, pixels 831 and 834 along common line 810b may comprise green pixels, and pixels 832 and 835 along common line 810c may comprise blue pixels. Thus, the 2×3 array may in an RGB display form two composite multicolor pixels 838a and 838b, where the multicolor pixel 838a comprises a red subpixel 830, a green subpixel 831, and a blue subpixel 832, and the multicolor pixel 838b comprises a red subpixel 833, a green subpixel 834, and a blue subpixel 835.

In such an array with different color pixels, the structure of the different color pixels varies with color. These structural differences result in differences in hysteresis characteristics, which further result in different suitable hold and actuation voltages. In one implementation where the release voltage $V_{REL}$ is zero (ground), to drive an array of three different color pixels with the waveforms depicted in FIG. 9, a power supply would need to generate a total of fourteen different voltages (e.g., $V_{OVPR}$, $V_{CPR}$, $V_{CNR}$, $V_{OVNR}$, $V_{OVPG}$, $V_{CPG}$, $V_{CNG}$, $V_{OVNG}$, $V_{OVPB}$, $V_{CPB}$, $V_{CNB}$, $V_{OVNB}$, $V_{SP}$ and $V_{SN}$) to drive the common and segment lines.

Figure 10:
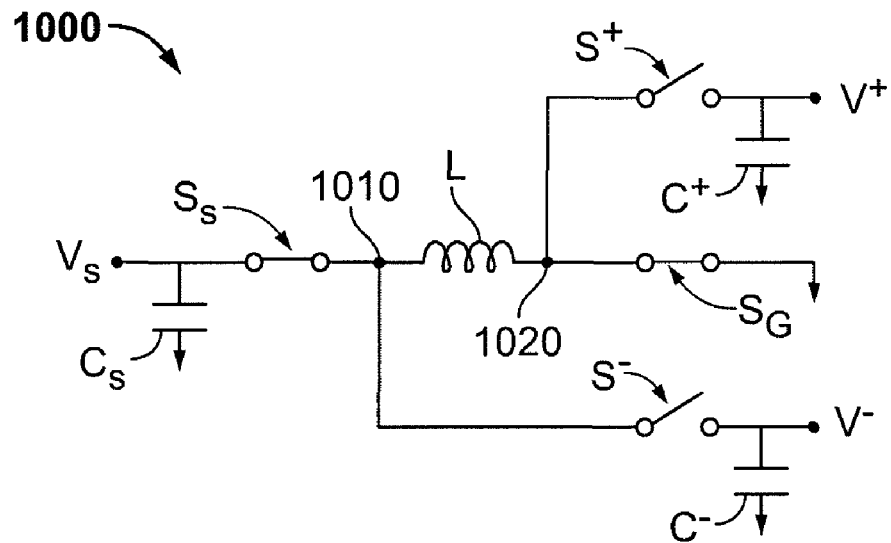
FIG. 10 shows an example of a schematic circuit diagram of a power supply in a magnetizing configuration.

In some implementations, a power supply can be capable of generating multiple voltages, both positive and negative, using a single source voltage and a single inductor. FIG. 10 shows an example of a schematic circuit diagram of a power supply 1000 in a magnetizing configuration. The power supply 1000 includes an inductor L having a first end 1010 coupled via a source switch $S_S$ to a source voltage $V_S$ and a second end 1020 coupled via a ground switch $S_G$ to a ground potential. The first end 1010 of the inductor L is also coupled via a negative output switch $S^-$ to a negative output $V^-$. The second end 1020 of the inductor L is also coupled via a positive output switch $S^+$ to a positive output $V^+$. The voltage source $V_S$ is coupled to the ground potential via a source capacitor $C_S$. Similarly, the positive output is coupled to the ground potential via a positive output capacitor $C^+$ and the negative output is coupled to the ground potential via a negative output capacitor $C^-$.

Each of the switches allow current to flow through it in at least one direction in a closed state, while disallowing current from flowing through it in an open state. The switches may be, for example, mechanical switches, FET transistors, two transistor transmission gates, or diodes (as illustrated in, for example, FIG. 14).

In the absence of a load, such as, e.g., a connection to a common line during the process of writing data to the line as described above with respect to FIGS. 8 and 9, at the positive output $V^+$, the positive output capacitor $C^+$ retains any present charge (except perhaps for small leakage currents) while the voltage at the positive output r is substantially stable. If a load is present, charge will flow from the positive output capacitor $C^+$ through the load, thereby decreasing the magnitude of the voltage at the positive output $V^+$. Similarly, in the absence of a load at the negative output $V^-$, the negative output capacitor $C^-$ retains any present charge and the voltage at the negative output $V^-$ is substantially stable. If a load is present, charge will flow to the negative output capacitor $C^-$ through the load, thereby decreasing the magnitude of the voltage at the negative output $V^-$.

As mentioned above, if a load is present at the positive output r, the magnitude of the voltage slowly decreases as current flows from the positive output capacitor $C^+$ through the load to the ground potential. Once the magnitude of the voltage decreases below a predetermined threshold, the switches can be controlled such that additional positive charge is pumped into the positive output capacitor $C^+$ as described below with respect to FIGS. 11 and 13. Similarly, if a load is present at the negative output $V^-$, the magnitude of the voltage slowly decreases as current flows to the negative output capacitor $C^-$ through the load from the ground potential. Once the magnitude of the voltage decreases below a predetermined threshold, the switches can be controlled such that additional positive charge is drained from the negative output capacitor $C^-$ as described below with respect to FIGS. 12 and 13. FIGS. 10-13 illustrate the operational modes of a power supply in some implementations of the invention. In these implementations, current flow is initiated in an inductor, and this current is then routed to or from a desired output until the inductor current is zero again. The timing of these current pulses and the outputs to which they are directed is determined by the desired voltage levels on the outputs.

In the magnetizing configuration illustrated in FIG. 10, the source switch $S_S$ and the ground switch $S_G$ are in a closed state, whereas the positive output switch $S^+$ and the negative output switch $S^-$ are in an open state. Thus, the first end 1010 of the inductor L is subjected to the source voltage $V_S$, the second end 1020 of the inductor L is subjected to the ground potential, and current increases through the inductor from zero at a rate defined by $V_S/L$, (since V=L(di/dt) for an inductor) thereby magnetizing it.

Figure 11:
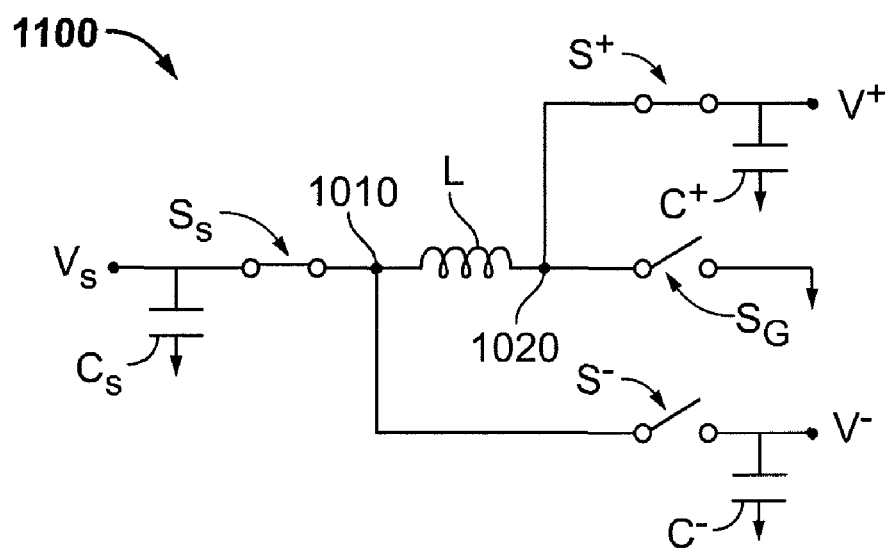
FIG. 11 shows an example of a schematic circuit diagram of a power supply configured to charge a positive output capacitor.

FIG. 11 shows an example of a schematic circuit diagram of a power supply 1100 configured to charge a positive output capacitor. The power supply 1100 may, for example, positively charge the positive output capacitor using the current generated when the supply was in the configuration depicted in FIG. 10. The configuration of the power supply 1100 differs from that of FIG. 10 in that the ground switch $S_G$ is in an open state, whereas the positive output switch $S^+$ is in a closed state. Thus, the inductor L demagnetizes as current flows from the source voltage $V_S$ through the inductor L to the positive output capacitor $C^+$, thereby positively charging the positive output capacitor $C^+$ Alternatively stated, as current flows to the positive output capacitor $C^+$, electrons move (in the opposite direction of the current) away from the positive output capacitor $C^+$, thereby decreasing the amount of negative charge relative to the amount of positive charge of the positive output capacitor $C^+$. This change in the amount of charge results in a net positive charge and a corresponding positive voltage. Because the output voltage $V^+$ is greater than source voltage $V_S$, the current in the inductor L decreases with a slope of $(V^+ - V_S)/L$ until the current through the inductor L reaches zero again, at which point switches $S_S$ and $S^+$ can be opened.

Figure 12:
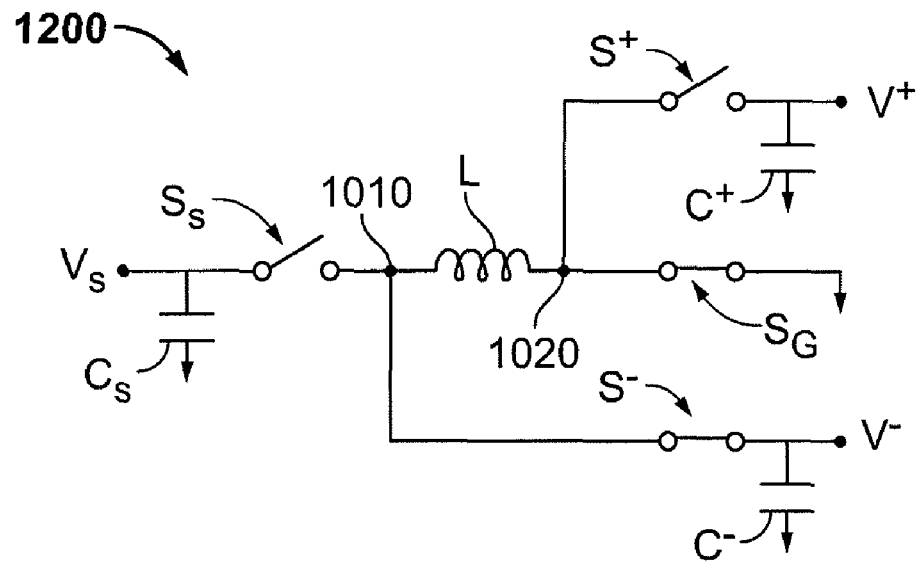
FIG. 12 shows an example of a schematic circuit diagram of a power supply configured to charge a negative output capacitor.

FIG. 12 shows an example of a schematic circuit diagram of a power supply 1200 configured to charge a negative output capacitor. The power supply 1300 may, for example, negatively charge the negative output capacitor using current generated when the supply was in the configuration depicted in FIG. 10. The configuration of the power supply 1200 differs from that of FIG. 11 in that the source switch $S_S$ and the positive output switch $S^+$ are in an open state, whereas the ground switch $S_G$ and the negative output switch $S^-$ are in a closed state. As in the configuration in FIG. 11, the inductor L demagnetizes. However, the inductor L demagnetizes as current flows from the negative output capacitor C⁻ through the inductor L to the ground potential, thereby negatively charging the negative output capacitor C⁻. Alternatively stated, as current flows from the negative output capacitor C⁻, electrons move (in the opposite direction of the current) into the negative output capacitor C⁺, thereby increasing the amount of negative charge relative to the amount of positive charge of the negative output capacitor C⁺. This change in the amount of charge results in a net negative charge and a corresponding negative voltage. In this case, the current in the inductor L decreases with a slope of V⁻/L until the current through the inductor reaches zero again, at which point switches S⁻ and $S_G$ can be opened.

Figure 13:
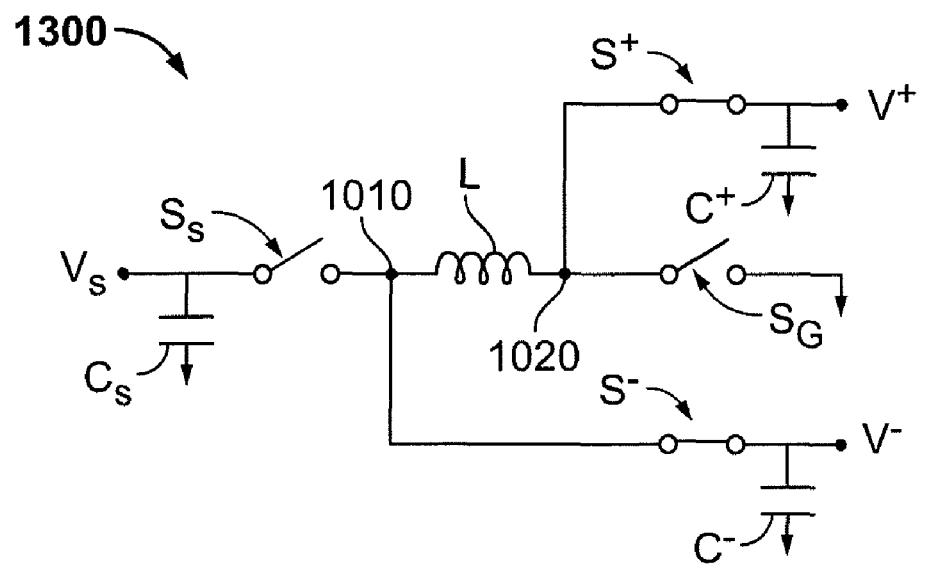
FIG. 13 shows an example of a schematic circuit diagram of a power supply configured to charge a positive output capacitor and charge a negative output capacitor.

FIG. 13 is a schematic circuit diagram of a power supply configured to charge a positive output capacitor and charge a negative output capacitor. The power supply 1300 may, for example, charge the output capacitors simultaneously using current generated when the supply was in the configuration depicted in FIG. 10. The configuration of the power supply 1300 differs from that of FIG. 12 in that the ground switch $S_G$ is in the open state and the positive output switch S⁺ is in the closed state. In this configuration, the inductor L demagnetizes as current flows from the negative output capacitor C⁻ through the inductor L to the positive output capacitor C⁺, thereby negatively charging the negative output capacitor C⁻ and positively charging the positive output capacitor C⁺ at the same time. Under these conditions, the current decreases with a slope of (V+−V−)/L until the current through the inductor L reaches zero again, at which point switches S⁺ and S⁻ can be opened. This configuration enables both a positive and negative output to be charged without any additional drain on the source $V_S$.

Figure 14:
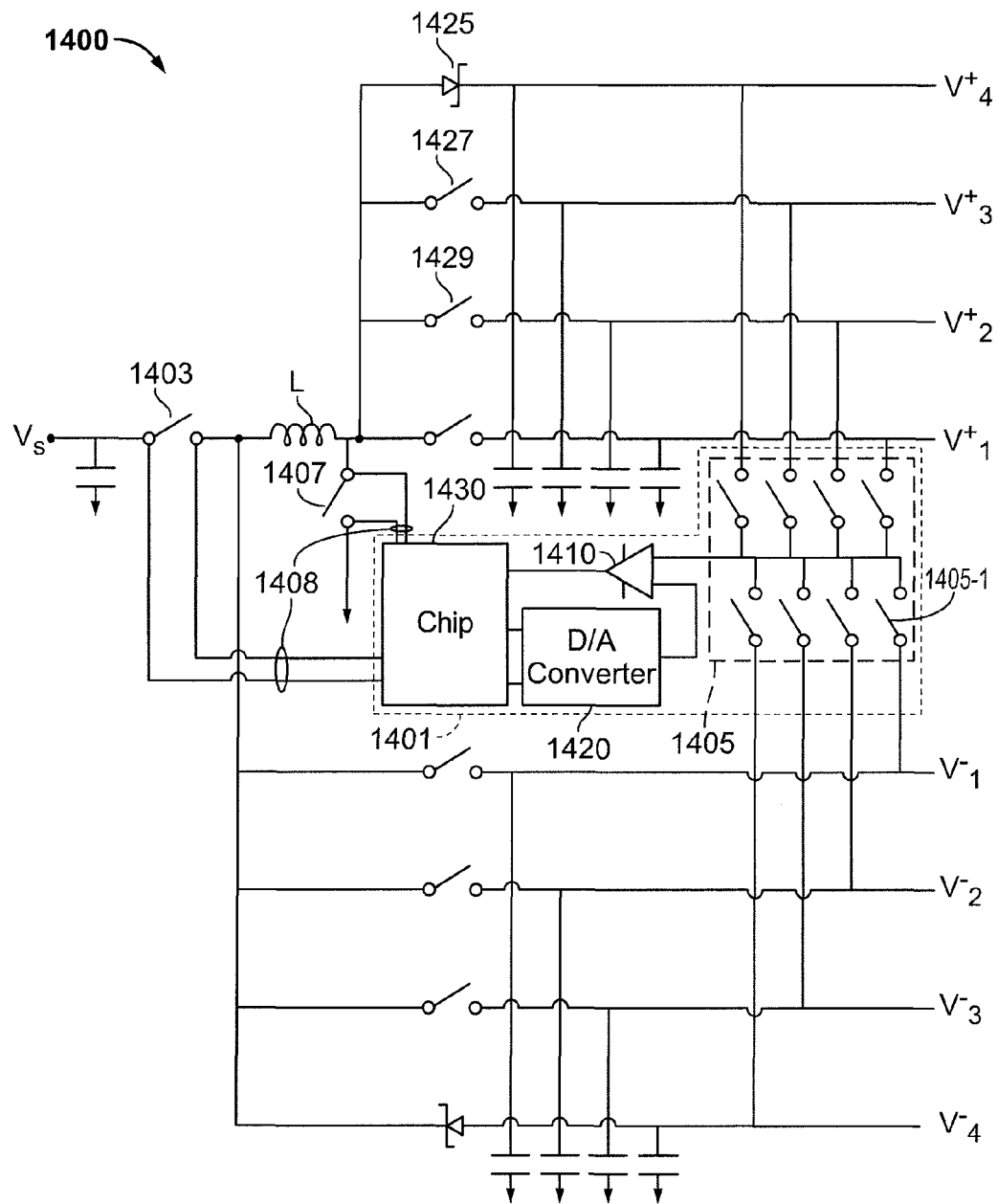
FIG. 14 shows an example of a schematic circuit diagram of a multiple-out power supply having a controller.

The configurations described above with respect to FIGS. 10-13 also can be used as part of a multiple-output power supply, which provides multiple positive voltages and multiple negative voltages. FIG. 14 shows an example of a schematic circuit diagram of a power supply 1400 of a multiple-out power supply having a controller. The power supply may include multiple outputs for providing a positive voltage and multiple outputs for providing a negative voltage. In some implementations, the switches of the power supply $V_S$ are selectively controlled by a controller 1401. The power supply 1400 also illustrates an implementation in which certain of the switches are formed as diodes. In one implementation, diodes are used as switches to the high-magnitude positive and negative outputs, $V^+_4$ and $V^-_4$, respectively. In one embodiment, the diodes are Schottky diodes. In another embodiment, the diodes are Zener diodes. These diodes function automatically as the switches S⁺ and S⁻ described above with respect to FIGS. 10-13 when they are placed in the switch position for the highest positive and lowest negative output voltage lines as described below.

When the voltage difference between the second end of the inductor L and the highest positive output voltage line is above a specific amount, the diode functions as a closed switch allowing current to flow into the capacitor coupled to the highest positive output voltage line. This current flow increases the voltage drop across the capacitor and, correspondingly, the voltage at the highest positive output voltage line. If a switch to another positive output is closed, the diode will be reversed biased, and will behave as an open switch.

Similarly, when the voltage difference between first end of the inductor L and the lowest negative output voltage is below a specific voltage, the diode functions as a closed switch allowing current to flow from the capacitor coupled to the lowest negative output voltage line. If a switch to another negative output is closed, the diode will be reversed biased, and will behave as an open switch.

The controller 1401 can be electrically coupled to each of the outputs so as to determine the voltage at each of the outputs. Although not illustrated, the controller 1401 is electrically connected to each of the switches (e.g., to the base or gate of respective transistors) and is capable of placing each of them in an open or closed state. The controller 1401 is configured to selectively open and close the switches based on the determined voltages at the outputs. The controller 1401 also can be configured to sense the current through the inductor, either directly, or indirectly by sensing the current through switches 1403 and 1407. This current may be monitored by sensing the voltage drop across switches 1403 and 1407 with lines 1408.

In the illustrated embodiment, the controller 1401 includes a number of controller switches 1405 for selecting the voltage at the outputs. The controller 1401 switches can form a multiplexer. In one embodiment, the controller 1401 repeatedly cycles through the controller switches 1405, selecting the voltage at each of the outputs in turn. The controller 1401 includes a comparator/error amplifier 1410 having two inputs. The first input of the comparator 1410 is the voltage at a selected one of the positive outputs or negative outputs. The second input of the comparator is provided by digital-to-analog converter (D/A converter) 1420 which is controlled by a chip 1430. The output of the D/A converter 1420 is synchronized to the operation of the controller switches 1405 such that the output of the D/A converter 1420 is equal to the desired output voltage of the output with the closed controller switch. Thus, if switch 1405-1 is closed, the output of the D/A converter is equal to the desired output for $V^-_1$. As the controller 1401 cycles through these controller switches 1405, an output error signal is generated by the comparator 1410 for each output, all of which are fed to the chip 1430.

In some implementations, the controller 1401 is configured to maintain a number of substantially constant voltages at the respective outputs. In one embodiment, the controller 1401 configures the switches so as to magnetize the inductor from substantially zero to a predetermined magnetization then demagnetizes the inductor so as to maintain the substantially constant voltages at the respective outputs until the magnetization is reduced again to substantially zero. Then, the controller 1401 repeats the process by configuring the switches so as to magnetize the inductor to the predetermined magnetization. The controller 1401 configures the switches so as to sequentially demagnetize the inductor by providing charging current to capacitors at outputs for which the voltage is less than desired as determined by the comparator 1410.

A person having ordinary skill in the art will understand that the number of output voltages relates to the number of switch/capacitor pairs (a single switch and a single capacitor making a single switch/capacitor pair). In FIG. 14, there are eight switch/capacitor pairs, providing four positive and four negative voltages. More switch/capacitor pairs will provide more voltages and fewer pairs will provide fewer voltages. In another implementation, the number of positive switch/capacitor pairs is not equal to the number of negative switch/capacitor pairs.

Figure 15:
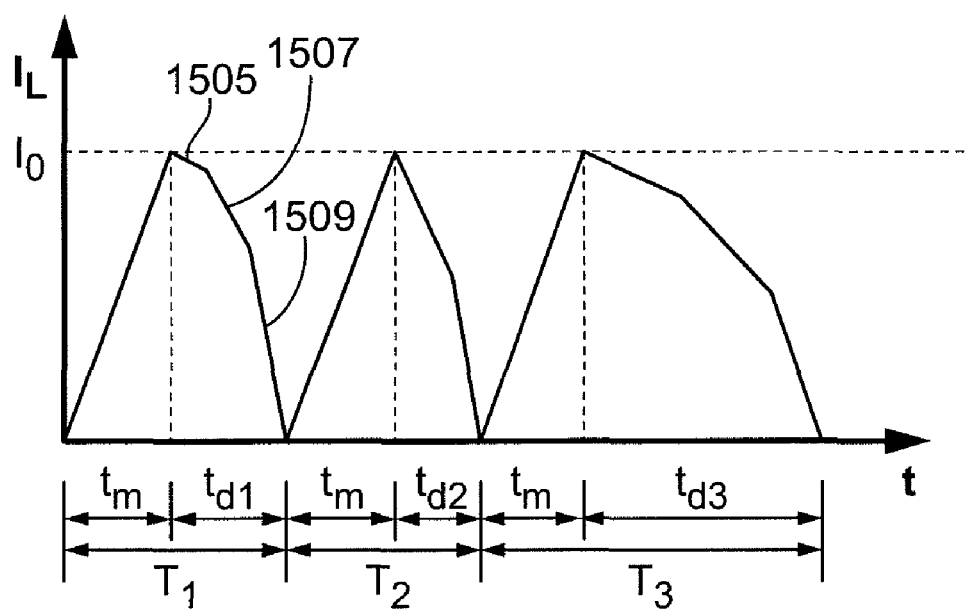
FIG. 15 shows an example of a plot of inductor current ($I_L$ on the vertical axis) versus time (t on the horizontal axis) according to one implementation.

FIG. 15 shows an example of a plot of inductor current ($I_L$ on the vertical axis) versus time (t on the horizontal axis) according to one implementation. In this implementation, a single current pulse is shared among a plurality of outputs. An inductor, such as inductor L illustrated in FIG. 14, is magnetized by closing switches, such as switches 1403 and 1407 of FIG. 14, until a predetermined current $I_0$ flows through the inductor L. The amount of time needed to magnetize the inductor is dependent on, among other factors, the desired current flow. In this example, current level $I_0$ is reached at time $t_m$. Then, the inductor L is demagnetized as the output switches are sequentially and selectively closed and current flows through the inductor L to or from the output capacitors, depending on the configuration of the switches. For example, during the time marked $t_{d1}$ on FIG. 15, the controller may first open the ground switch 1407 while leaving source switch 1403 closed to allow current to flow through diode 1425 to charge capacitor coupled to output $V^+_4$ during time period 1505. During period 1507, the controller may close positive output switch 1427 forcing inductor current to flow into the capacitor coupled to output $V^+_3$. Then, during period 1509, the controller may open switch 1427 and close switch 1429, forcing inductor current to flow into the capacitor coupled to output $V^+_2$. The slopes of these three portions of the current curve are different because the output voltages are different, producing a different potential across the inductor L, and thus a different $dI_L/dt$. Thus, the current $I_L$ flowing through the inductor L is sequentially shared with different outputs.

In this embodiment, it can be possible to monitor the voltage level at all of the power supply outputs simultaneously, so that the appropriate multiple outputs to be charged with a single pulse are all identified at once. This can be accomplished by eliminating the switches 1405 from the circuit of FIG. 14, and routing each output sense line to a separate input on the chip 1430.

When the current reaches zero at the end of time period $t_{d1}$, the controller 1401 may then open switch 1429 and close ground switch 1407, starting a new cycle shown as $T_2$ in FIG. 15. Under light loads, some time may be allowed to pass prior to starting a new cycle, and instead of closing switch 1407 at the end of a cycle, the controller may open source switch 1403 at the end of a cycle, leaving ground switch 1407 open as well. The controller 1401 then may wait until a charging pulse is needed before closing switches 1403 and 1407 again to start another cycle.

Figure 16:
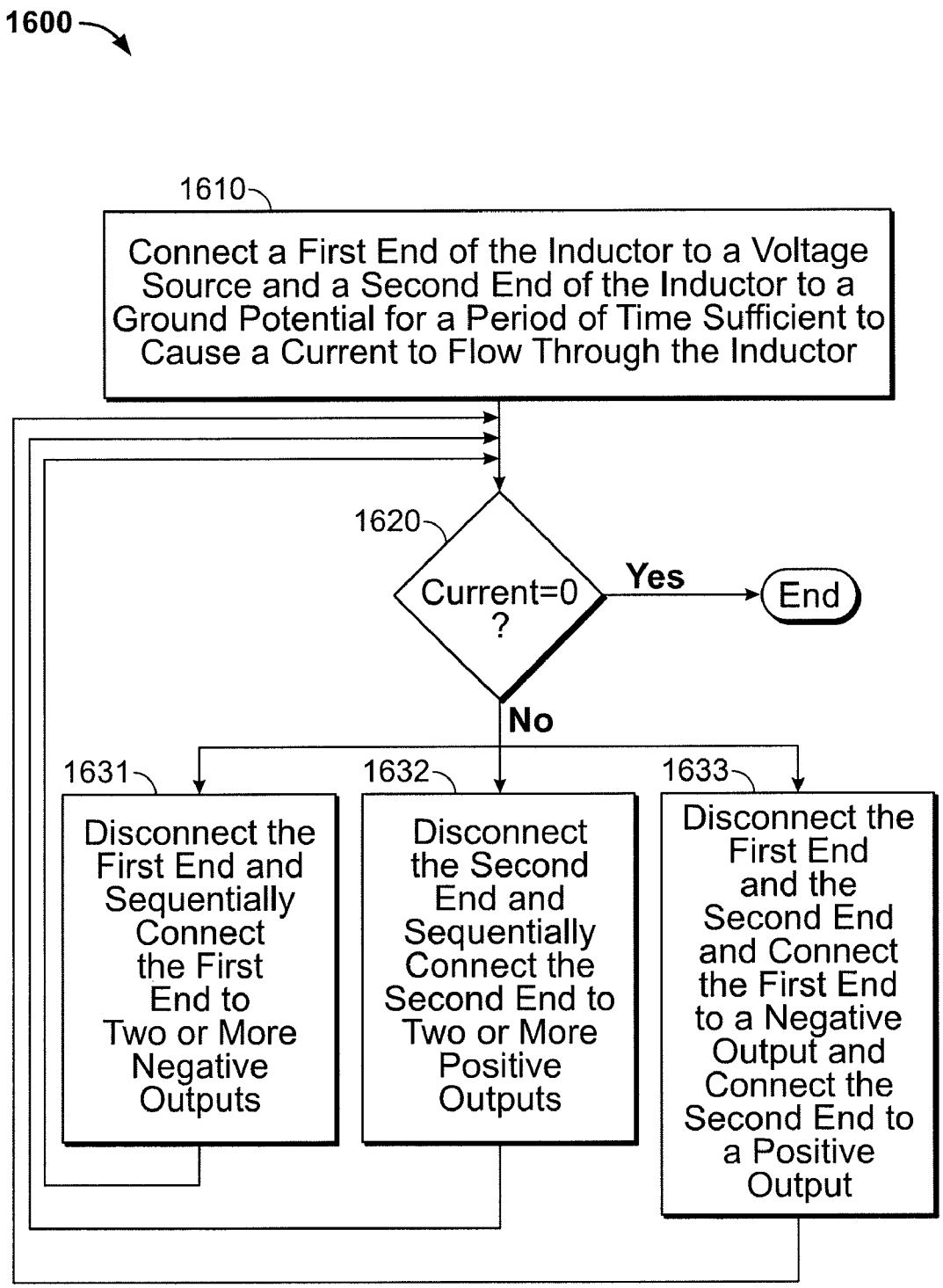
FIGS. 16 and 17 show examples of a flow diagram illustrating a process for providing negative and positive voltages of a power supply.

FIG. 16 shows an example of a flow diagram illustrating a process 1600 for providing negative and positive voltages of a power supply. The process 1600 begins, at block 1610, with connecting a first end of an inductor to a voltage source and a second end of the inductor to a ground voltage for a period of time sufficient to cause a current to flow through the inductor. The connecting can be performed, for example, by controller 1401 of FIG. 14 by closing switch 1403 and switch 1407.

In block 1620, it is determined whether the current flowing through the inductor is substantially zero. The determination can be performed, for example, by controller 1401 of FIG. 14 by sensing the current through the inductor, either directly, or indirectly by sensing the current through switches 1403 and 1407. For example, the current may be monitored by sensing the voltage drop across switches 1403 and 1407 with lines 1408. In some implementations, it is determined that the current flowing through the inductor is substantially zero if the current is below a nominal threshold, e.g., 5 mA.

Until the current flowing through the inductor drops substantially to zero, the process 1600 performs at least one of the steps described below with respect to blocks 1631, 1632 and 1633. For example, the process 1600 can perform the step described with respect to block 1631, then perform the step described with respect to block 1633. When it is determined, in block 1620, that the current flowing through the inductor is substantially zero, the process 1600 ends until another charge cycle is desired.

In block 1631, the first end of the inductor is disconnected from the voltage source and sequentially connected to two or more negative outputs to cause the current flowing through the inductor to flow from at least two of the two or more negative outputs. The current flowing to the negative outputs may flow from capacitors coupled to the negative outputs. The disconnection can be performed, for example, by the controller 1401 of FIG. 14 by opening switch 1403. The sequential connection can be performed, for example, by the controller 1401 of FIG. 14 by closing one of the switches connected to a negative output, opening the switch, and closing another of the switches connected to another negative output. The sequentially connection can also be performed, in part, by a diode which connects the first end of the inductor to a negative output when the voltage difference between the negative output and the first end of the inductor is above a certain amount.

In block 1632, the second end of the inductor is disconnected from the ground potential and sequentially connected to two or more positive outputs to cause the current flowing through the inductor to flow to at least two of the two or more positive outputs. The current flowing to the positive outputs may further flow into capacitors coupled to the positive outputs. The disconnection can be performed, for example, by the controller 1401 of FIG. 14 by opening switch 1407. The sequential connection can be performed, for example, by the controller 1401 of FIG. 14 by closing one of the switches connected to a positive output (e.g., switch 1427), opening the switch, and closing another of the switches (e.g., switch 1429) connected to another positive output. The sequentially connection can also be performed, in part, by a diode (e.g., diode 1425) which connects the second end of the inductor to a positive output when the voltage difference between the positive output and the second end of the inductor is above a certain amount.

In block 1633, the first end of the inductor is disconnected from the voltage source, the second end of the inductor is disconnected from the ground potential, the first end of the inductor is connected to one of the two or more negative outputs, and the second end of the inductor is connected to one of the two or more positive outputs. The disconnection and connection can be performed, for example, by the controller 1401 of FIG. 14. In particular, disconnecting the first end of the inductor from the voltage source can be performed by opening switch 1403 and disconnecting the second end of the inductor from the voltage source can be performed by opening switch 1407. Connecting the first end of the inductor to one of the negative outputs can be performed by closing one of the switches connected to a negative output. Connecting the second end of the inductor to one of the positive outputs can be performed by closing one of the switches connected to a positive output (e.g., switch 1427 or 1429). The connection can also be performed, in part, by a diode (e.g., diode 1425) which connects one of the outputs to an end of the inductor when the voltage difference between the output and the end of the inductor is above a certain amount.

After performing at least one of the steps described above with respect to blocks 1631, 1632 and 1633 until the current flowing through the inductor drops to substantially zero, the process 1600 ends.

Figure 17:
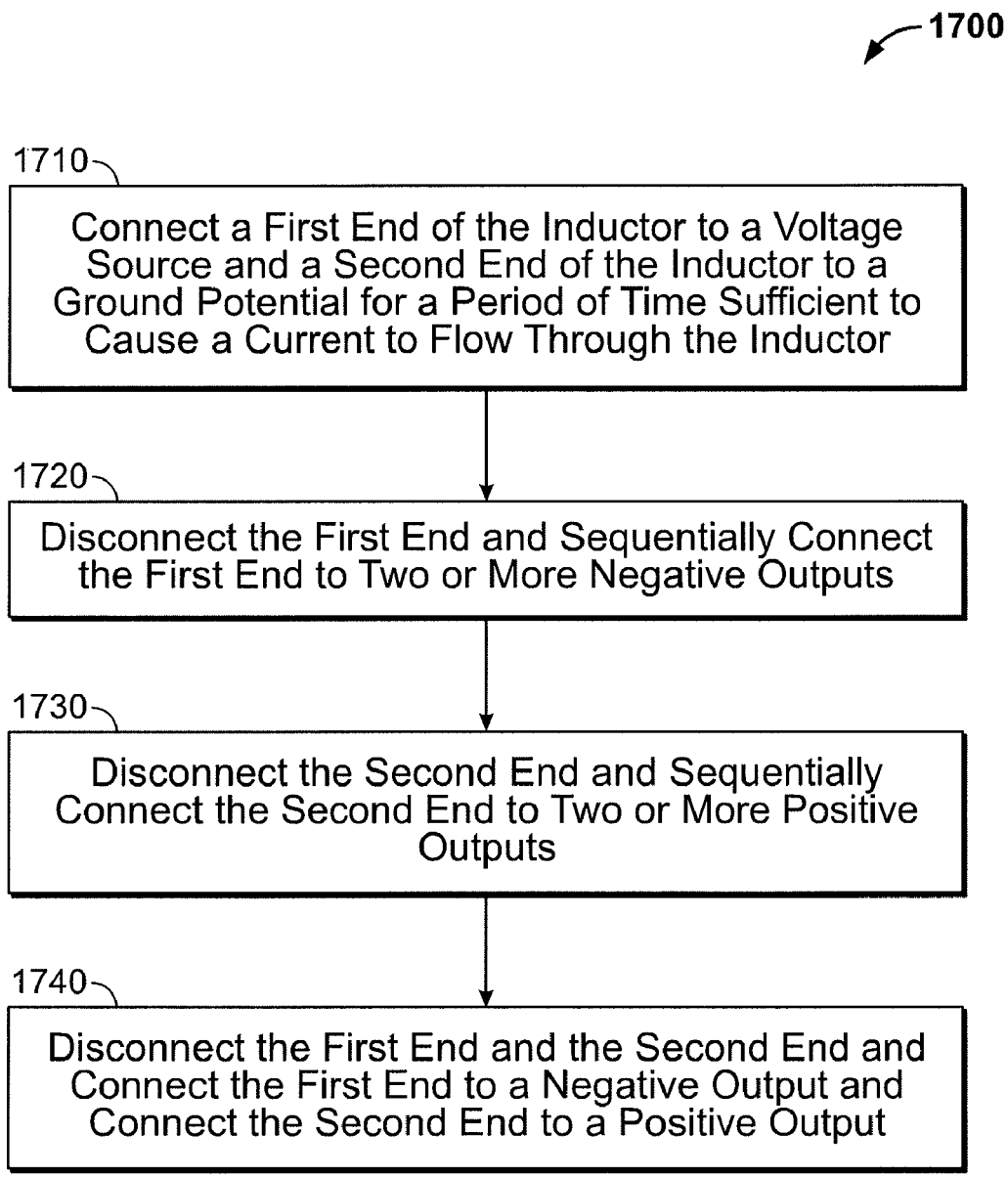

FIG. 17 shows another example of a flow diagram illustrating a process 1700 for providing negative and positive voltages of a power supply. The process 1700 begins, at block 1710, with connecting a first end of an inductor to a voltage source and a second end of the inductor to a ground voltage for a period of time sufficient to cause a current to flow through the inductor. The connecting can be performed, for example, by controller 1401 of FIG. 14 by closing switch 1403 and switch 1407.

In block 1720, the first end of the inductor is disconnected from the voltage source and sequentially connected to two or more negative outputs to cause the current flowing through the inductor to flow from at least two of the two or more negative outputs. The current flowing to the negative outputs may flow from capacitors coupled to the negative outputs. The disconnection can be performed, for example, by the controller 1401 of FIG. 14 by opening switch 1403. The sequential connection can be performed, for example, by the controller 1401 of FIG. 14 by closing one of the switches connected to a negative output, opening the switch, and closing another of the switches connected to another negative output. The sequentially connection can also be performed, in part, by a diode which connects the first end of the inductor to a negative output when the voltage difference between the negative output and the first end of the inductor is above a certain amount.

In block 1730, the second end of the inductor is disconnected from the ground potential and sequentially connected to two or more positive outputs to cause the current flowing through the inductor to flow to at least two of the two or more positive outputs. The current flowing to the positive outputs may further flow into capacitors coupled to the positive outputs. The disconnection can be performed, for example, by the controller 1401 of FIG. 14 by opening switch 1407. The sequential connection can be performed, for example, by the controller 1401 of FIG. 14 by closing one of the switches connected to a positive output (e.g., switch 1427), opening the switch, and closing another of the switches (e.g., switch 1429) connected to another positive output. The sequentially connection can also be performed, in part, by a diode (e.g., diode 1425) which connects the second end of the inductor to a positive output when the voltage difference between the positive output and the second end of the inductor is above a certain amount.

In block 1740, the first end of the inductor is disconnected from the voltage source, the second end of the inductor is disconnected from the ground potential, the first end of the inductor is connected to one of the two or more negative outputs, and the second end of the inductor is connected to one of the two or more positive outputs. The disconnection and connection can be performed, for example, by the controller 1401 of FIG. 14. In particular, disconnecting the first end of the inductor from the voltage source can be performed by opening switch 1403 and disconnecting the second end of the inductor from the voltage source can be performed by opening switch 1407. Connecting the first end of the inductor to one of the negative outputs can be performed by closing one of the switches connected to a negative output. Connecting the second end of the inductor to one of the positive outputs can be performed by closing one of the switches connected to a positive output (e.g., switch 1427 or 1429). The connection can also be performed, in part, by a diode (e.g., diode 1425) which connects one of the outputs to an end of the inductor when the voltage difference between the output and the end of the inductor is above a certain amount.

Figure 18A:
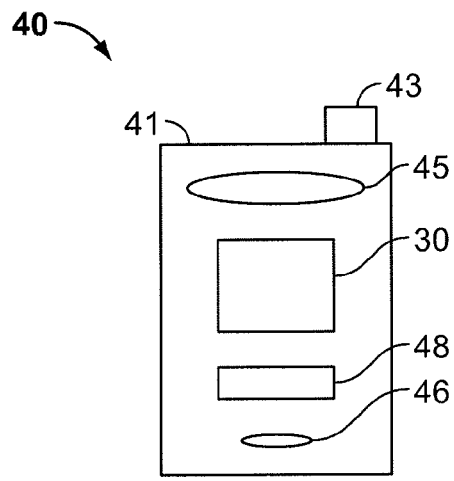
FIGS. 18A and 18B show examples of system block diagrams illustrating a display device that includes a plurality of interferometric modulators.
Figure 18B:
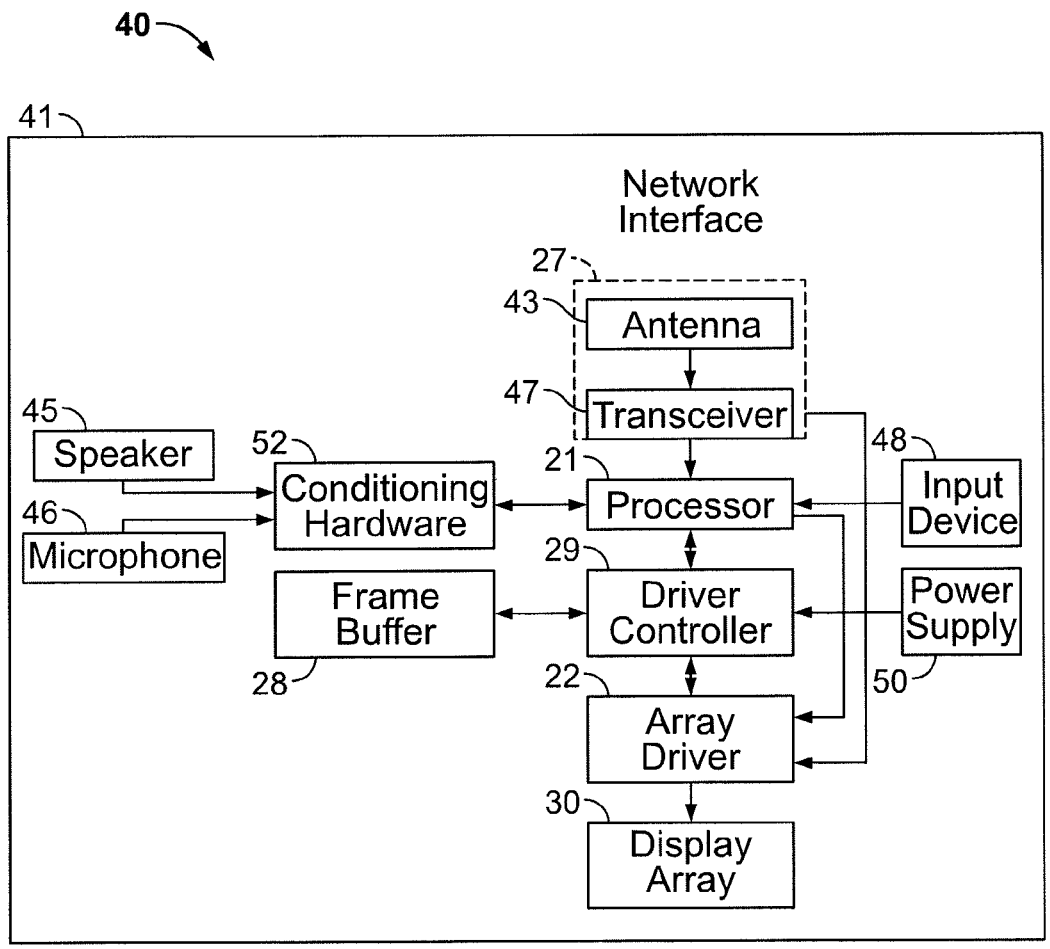

FIGS. 18A and 18B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 18B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described herein, including but not limited to the functions of the controller 1401 of FIG. 14, may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display device comprising:
 a plurality of display elements;
 a driver circuit configured to drive the display elements at a plurality of voltages; and
 a power supply configured to provide the plurality of voltages, the power supply comprising:
  an inductor having a first end coupled via a source switch to a voltage source and coupled via a first plurality of output switches to a respective plurality of negative outputs and a second end coupled via a ground switch to a ground potential and coupled via a second plurality of output switches to a respective plurality of positive outputs; and
 a controller adapted to configure the switches into at least:
  a first configuration in which the source switch is closed, each of the first plurality of output switches is open, the ground switch is closed, and each of the second plurality of output switches is open,
  a second configuration in which the source switch is closed, each of the first plurality of output switches is open, the ground switch is open, and one of the second plurality of output switches is closed, and
  a third configuration in which the source switch is open, one of the first plurality of output switches is closed, the ground switch is closed, and each of the second plurality of output switches is open.

2. The display device of claim 1, wherein the controller is further adapted to configure the switches into a fourth configuration in which the source switch is open, one of the first plurality of output switches is closed, the ground switch is open, and one of the second plurality of output switches is closed.

3. The device of claim 1, further comprising a multiplexer having a plurality of inputs coupled to each of the first and second plurality of outputs and a multiplexer output coupled to the controller.

4. The device of claim 3, wherein the multiplexer output is coupled to the controller via a comparator which compares the input voltage to a reference voltage.

5. The device of claim 1, further comprising a current sense circuit configured to determine the current passing through the inductor.

6. The device of claim 1, further comprising:
 a first plurality of capacitors, each of the first plurality of capacitors having a first end coupled to one of the first plurality of outputs and a second end coupled to a ground potential; and
 a second plurality of capacitors, each of the second plurality of capacitors having a first end coupled to one of the second plurality of outputs and a second end coupled to the ground potential.

7. The device of claim 1, wherein the controller is adapted to configure the switches based on a voltage at one or more of the outputs.

8. The device of claim 1, wherein at least one of the output switches is a diode.

9. A method of providing negative and positive outputs of a power supply, the method comprising:
 connecting a first end of an inductor to a voltage source and a second end of the inductor to a ground voltage for a period of time sufficient to cause a current to flow through the inductor;
 performing at least one of the following until the current flowing through the inductor drops substantially to zero:

disconnecting the first end of the inductor from the voltage source and sequentially connecting the first end of the inductor to two or more negative outputs to cause the current flowing through the inductor to flow from at least two of the two or more negative outputs;

disconnecting the second end of the inductor from the ground potential and sequentially connecting the second end of the inductor to two or more positive outputs to cause the current flowing through the inductor to flow to at least two of the two or more positive outputs; and disconnecting the first end of the inductor from the voltage source, disconnecting the second end of the inductor from the ground potential, connecting the first end of the inductor to one of the two or more negative outputs, and connecting the second end of the inductor to one of the two or more positive outputs.

10. The method of claim 9, comprising disconnecting the second end of the inductor from the ground potential and connecting the first end of the inductor to the voltage source.

11. The method of claim 9, comprising disconnecting the second end of the inductor from the ground potential and connecting the first end of the inductor to a negative output.

12. The method of claim 9, further comprising reconnecting the first end of the inductor to the voltage source and the second end of the inductor to the ground voltage for a period of time sufficient to cause the current to flow through the inductor.

13. The method of claim 9, further comprising determining the voltage at one or more of the negative or positive outputs, wherein disconnecting the first or second end of the inductor is based on the determined voltages.

14. An apparatus for providing negative and positive outputs of a power supply, the apparatus comprising:

means for connecting a first end of an inductor to a voltage source and a second end of the inductor to a ground voltage for a period of time sufficient to cause a current to flow through the inductor;

means for performing at least one of the following until the current flowing through the inductor drops substantially to zero:

disconnecting the first end of the inductor from the voltage source and sequentially connecting the first end of the inductor to two or more negative outputs to cause the current flowing through the inductor to flow from at least two of the two or more negative outputs;

disconnecting the second end of the inductor from the ground potential and sequentially connecting the second end of the inductor to two or more positive outputs to cause the current flowing through the inductor to flow to at least two of the two or more positive outputs; and disconnecting the first end of the inductor from the voltage source, disconnecting the second end of the inductor from the ground potential, connecting the first end of the inductor to one of the two or more negative outputs, and connecting the second end of the inductor to one of the two or more positive outputs.

15. The apparatus of claim 14, comprising means for disconnecting the second end of the inductor from the ground potential and connecting the first end of the inductor to the voltage source.

16. The apparatus of claim 14, comprising means for disconnecting the second end of the inductor from the ground potential and connecting the first end of the inductor to a negative output.

17. The apparatus of claim 14, further comprising means for reconnecting the first end of the inductor to the voltage source and the second end of the inductor to the ground voltage for a period of time sufficient to cause the current to flow through the inductor.

18. The apparatus of claim 14, further comprising means for determining the voltage at one or more of the negative or positive outputs, wherein disconnecting the first or second end of the inductor is based on the determined voltages.

19. A method of providing negative or positive outputs of a power supply, the method comprising:

connecting a first end of an inductor to a voltage source and a second end of the inductor to a ground voltage for a period of time sufficient to cause a current to flow through the inductor;

disconnecting the first end of the inductor from the voltage source and sequentially connecting the first end of the inductor to two or more negative outputs to cause the current flowing through the inductor to flow from at least two of the two or more negative outputs;

disconnecting the second end of the inductor from the ground potential and sequentially connecting the second end of the inductor to two or more positive outputs to cause the current flowing through the inductor to flow to at least two of the two or more positive outputs; and disconnecting the first end of the inductor from the voltage source, disconnecting the second end of the inductor from the ground potential, connecting the first end of the inductor to one of the two or more negative outputs, and connecting the second end of the inductor to one of the two or more positive outputs.

20. The method of claim 19, comprising disconnecting the second end of the inductor from the ground potential and connecting the first end of the inductor to the voltage source.

21. The method of claim 19, comprising disconnecting the second end of the inductor from the ground potential and connecting the first end of the inductor to a negative output.

22. The method of claim 19, further comprising reconnecting the first end of the inductor to the voltage source and the second end of the inductor to the ground voltage for a period of time sufficient to cause the current to flow through the inductor.

23. The method of claim 19, further comprising determining the voltage at one or more of the negative or positive outputs, wherein disconnecting the first or second end of the inductor is based on the determined voltages.

24. An apparatus for providing negative or positive outputs of a power supply, the apparatus comprising:

means for connecting a first end of an inductor to a voltage source and a second end of the inductor to a ground voltage for a period of time sufficient to cause a current to flow through the inductor;

means for disconnecting the first end of the inductor from the voltage source and sequentially connecting the first end of the inductor to two or more negative outputs to cause the current flowing through the inductor to flow from at least two of the two or more negative outputs;

means for disconnecting the second end of the inductor from the ground potential and sequentially connecting the second end of the inductor to two or more positive outputs to cause the current flowing through the inductor to flow to at least two of the two or more positive outputs; and means for disconnecting the first end of the inductor from the voltage source, disconnecting the second end of the inductor from the ground potential, connecting the first end of the inductor to one of the two or more negative outputs, and connecting the second end of the inductor to one of the two or more positive outputs.

25. The apparatus of claim 24, comprising means for disconnecting the second end of the inductor from the ground potential and connecting the first end of the inductor to the voltage source.

26. The apparatus of claim 24, comprising means for disconnecting the second end of the inductor from the ground potential and connecting the first end of the inductor to a negative output.

27. The apparatus of claim 24, further comprising means for reconnecting the first end of the inductor to the voltage source and the second end of the inductor to the ground voltage for a period of time sufficient to cause the current to flow through the inductor.

28. The apparatus of claim 24, further comprising means for determining the voltage at one or more of the negative or positive outputs, wherein disconnecting the first or second end of the inductor is based on the determined voltages.

* * * * *